United States Patent [19]

Nagano

[11] Patent Number: 4,575,365
[45] Date of Patent: Mar. 11, 1986

[54] REAR DERAILLEUR FOR A BICYCLE
[75] Inventor: Masashi Nagano, Izumi, Japan
[73] Assignee: Shimano Industrial Company Limited, Osaka, Japan
[21] Appl. No.: 636,012
[22] Filed: Jul. 30, 1984
[30] Foreign Application Priority Data
  Aug. 2, 1983 [JP] Japan .............................. 58-121079[U]
  Aug. 2, 1983 [JP] Japan .............................. 58-121080[U]
[51] Int. Cl.[4] ......................... F16H 11/08; F16H 7/22
[52] U.S. Cl. ......................................... 474/80; 474/82
[58] Field of Search ..................................... 474/78-83
[56] References Cited
U.S. PATENT DOCUMENTS
  4,286,953 9/1981 Shimano ................................ 474/80
  4,348,198 9/1982 Shimano ............................ 474/80 X
  4,410,313 10/1983 Shimano ................................ 474/82

Primary Examiner—J. Stephen Novosad
Assistant Examiner—Thuy M. Bui
Attorney, Agent, or Firm—Stevens, Davis, Miller & Mosher

[57] ABSTRACT

A rear derailleur has a chain guide which includes a guide pulley, a tension pulley, and at least one pulley plate for rotatably supporting the pulleys. A driving chain guided by the guide pulley is switched to a desired sprocket of a multistage sprocket assembly for changing the bicycle speed. The guide pulley is supported axially movably with respect to the pulley plate. Between one lateral side of the guide pulley and the inside surface of the pulley plate a gap is provided for allowing the guide pulley to move axially relative to the pulley plate by means of tension of the chain.

5 Claims, 4 Drawing Figures

REAR DERAILLEUR FOR A BICYCLE

FIELD OF THE INVENTION

This invention relates to a rear derailleur for a bicycle and more particularly to a rear derailleur for switching a driving chain from one sprocket to another of a multistage sprocket assembly for the bicycle.

BACKGROUND OF THE INVENTION

Generally, this kind of rear bicycle derailleur is provided with a fixing member, a movable member movable axially with respect to the fixing member, a chain guide having a guide pulley, a tension pulley and pulley plates, with the chain guide assembly being and supported swingably to the movable member, and a tension spring interposed between the movable member and the chain guide. When a speed control lever is forwardly operated it makes the movable member via a control wire toward a maximum tooth number low speed sprocket against the bias of a return spring. When the lever is backwardly operated it moves the movable member toward a minimum tooth number high speed sprocket by use of a restoring force of the return spring. The chain guide is stopped at the position corresponding to a desired sprocket to thereby switch thereto the chain.

A cyclist, especially, an unskilled cyclist, may insufficiently operate the operating lever and stop the chain guide before the center line of the width of the desired sprocket, resulting in an insufficient movement of the chain guide.

The chain guide at the conventional derailleur, as shown in FIG. 4, has a pair of pulley plates a and b supported swingably to a fixed shaft e at the movable member d through a tubular pivot shaft c fixed to one pulley plate. A bearing cylinder f is supported between the pulley plates a and b, and a guide pulley g is supported rotatably onto the outer periphery of bearing cylinder f. A screw thread h is formed on the outer periphery of the end of pivot shaft c, and a nut n tightly screws with the screw thread h, so that the other pulley plate b is axially moved to hold the bearing cylinder f between the pulley plates a and b and also to restrain the guide pulley g from axial movement.

Therefore, when an amount of movement of the chain guide is insufficient, the chain having engaged with the desired sprocket skews between the guide pulley and the sprocket in engagement with the chain. Hence, the skewed portion of the chain often strikes the exit portion for the chain at the guide pulley and the teeth at the entrance portion for the chain at the sprocket, thereby generating loud noises.

SUMMARY OF THE INVENTION

An object of the invention is to provide a rear derailleur which uses chain tension caused by a tension spring to move the guide pulley toward the sprocket to which the chain has been switched, so that the skewed portion of the chain is decreased in its degree of skew to thereby surely eliminate noises generated when the chain guide is short of its shift.

The rear derailleur of the invention is provided with a fixing member, a movable member movable with respect thereto, a chain guide provided with a guide pulley, a tension pulley and a pulley plate, and supported swingably to the movable member, and a tension spring interposed between the movable member and the chain guide. A support means is provided for supporting the guide pulley to the pulley plate in relation of being rotatable and axially movable in a predetermined range with respect thereto. The chain guide forms a gap between the guide pulley and the pulley plate to thereby allow the guide pulley to move through the gap.

Accordingly, when the chain guide shifts insufficiently to skew the chain between the desired sprocket and the chain guide, the guide pulley is moved axially in a predetermined range through the gap by operation of chain tension caused by the tension spring and stops at the position corresponding to the center line of width of the sprocket. Hence, the skewed chain line is corrected, thereby ensuring that the chain is prevented from striking the teeth at the exit portion for the chain at the guide pulley and at the entrance portion for the chain at the sprocket, thereby enabling prevention of noise generation.

A preferred embodiment of the support means of the invention uses a bearing cylinder fixed to the pulley plate by means of a spring force of the tension spring and having a slide surface for the guide pulley and an annular projection at a spring holder. The spring holder is engageable with the axial end face of the bearing cylinder by means of the spring force of the tension spring and projects radially outwardly beyond the outer periphery of the bearing cylinder so as to restrict a range of movement of the guide pulley.

The above and other related objects and features of the invention will be apparent from a reading of the following description with reference to the accompanying drawings.

DETAILED DESCRIPTION OF THE INVENTION

Figure 1:
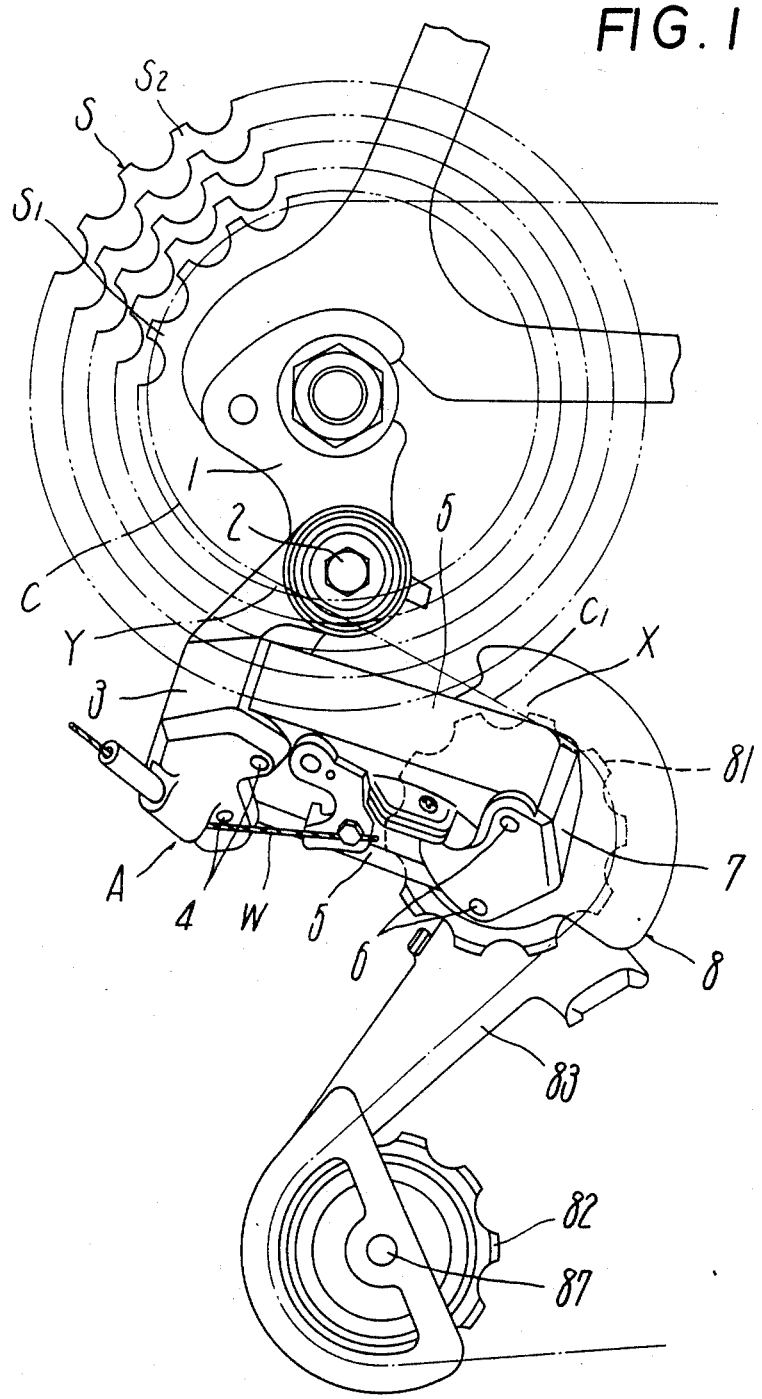
FIG. 1 is a front view of an embodiment of a rear derailleur of the invention, in condition of being mounted together with a multistage sprocket assembly to the bicycle frame.

A derailleur shown in the drawing is used corresponding to a multistage sprocket assembly mounted to a rear hub at the bicycle. The derailleur basically comprises a rear derailleur body A comprising a fixing member 3 pivoted to a mounting bracket 1 for the rear hub through a horizontal shaft 2, a pair of linkage members 5 pivoted to the fixing member 3 through a pair of first pins 4, and a movable member 7 pivoted to the fore ends of linkage members 5 through a pair of second pins 6 respectively. The derailleur also includes a chain guide 8 comprising a guide pulley 81 for guiding a driving chain from one to another of the multistage sprockets, a tension pulley 82 and one pulley plate 83 for supporting the pulleys 81 and 82, plate 83 being supported swingably to the movable member. Tension spring 12 interposed between the chain guide 8 and the movable member 7 biases the chain guide 8 clockwise in FIG. 1.

The chain guide 8 has the guide pulley 81 disposed near the multistage sprocket assembly S and the tension pulley 82 disposed spaced apart therefrom, the chain C is carried by the pulleys 81 and 82, a control wire W fixed to the linkage member 5 is pulled to shift the movable member 7 against a return spring (not shown) toward a maximum tooth number low speed sprocket $S_2$, and a restoring force of the spring shfts the same toward a minimum tooth number high speed sprocket $S_1$ thereby switching the chain C to a desired sprocket of the multistage sprocket assembly S.

Figure 2:
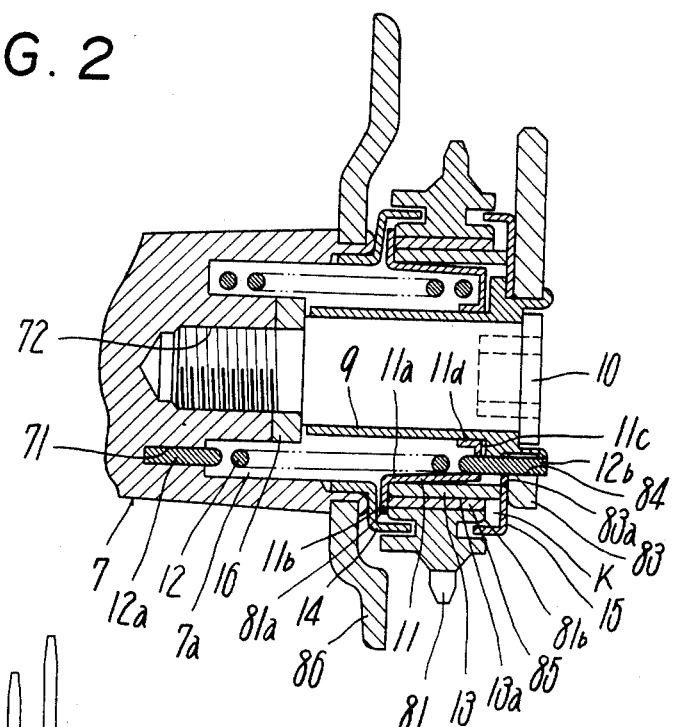
FIG. 2 is an enlarged sectional view of the principal portion only at the rear derailleur in FIG. 1.
Figure 3:
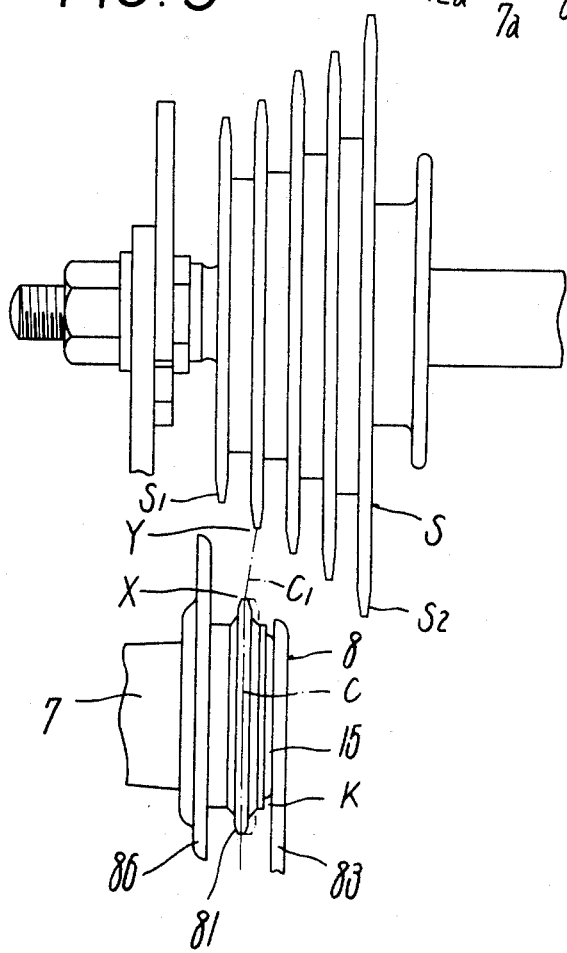
FIG. 3 is an illustration of chain switching.

In the rear derailleur of the invention constructed as abovementioned and shown in FIGS. 1 through 3, a cylindrical pivot shaft 9 is fixed to one end of pulley plate 83, and the pulley plate 83 is supported swingably through the pivot shaft 9 to a fixing shaft 10 fixed to the movable member 7. At the outer periphery of pivot shaft 9 are supported a spring holder 11 comprising a cylinder 11a, an outward flange 11b extending radially outwardly from one axial end of cylinder 11a, and an inward flange 11c extending radially inwardly from the other axial end of cylinder 11a. Tension spring 12, which includes a coiled spring with a pair of first and second retaining ends 12a and 12b is disposed in holder 11. The tension spring 12 abuts at its one coiled end against the bottom of an annular recess 7a at the movable member 7 and at the other coiled end against the lateral side of inward flange 11c so that an elastic force of tension spring 12 axially acts on the spring holder 11. The first retaining end of tension spring 12 is insertable retained into a bore 71 within the recess 7a, and the second retaining end of the same perforates the inward flange 11c to be insertably retained into a bore 84 provided at the pulley plate 83. Bearing cylinder 13 having at the outer periphery a slide surface 13a for the guide pulley 81 is supported onto the outer periphery of spring holder 11, and abuts at one axial end against the inside surface of pulley plate 83 through a cup 15. The other axial end of bearing cylinder 13 engages with the outer flange 11b at the spring holder 11. Tension spring 12 biases by its spring force the bearing cylinder 13 toward the pulley plate 83 and fixes the same thereto. Guide pulley 81 is supported rotatably and axially movably onto the outer periphery of bearing cylinder 13. Outward flange 11b engages with the inside surface 81a of the boss of guide pulley 81 to restrict the guide pulley 81 from moving toward the movable member 7. Between the outside surface 81b of the boss of guide pulley 81 and the pulley plate 83 is provided a gap K, which allows the guide pulley 81 to axially move relative to bearing cylinder 13. Gap K is formed by making bearing cylinder 13 larger in axial length than the boss of the guide pulley 81 as shown in FIG. 2. In addition, a bushing is fitted into a shaft bore at the boss of guide pulley 81, and the bearing cylinder 13 is formed of a sintered alloy.

A cylindrical portion 11d is provided at the utmost end of outward flange 11c at the spring holder 11 and is fitted onto the pivot shaft 9 to prevent radial play with respect to the bearing cylinder 13. The spring holder 11 is not limited in construction to the embodiment illustrated in the Figures in brief, in accordance with the present invention holder 11 need only apply the axial resilient force of tension spring 12 to the bearing cylinder 13.

Incidentally, the rear derailleur shown in the drawing is so constructed that the first pins 4 and second pins 6 are slanted with respect to the plane perpendicular to the axis of the multistage sprocket assembly S, so that when the chain is switched, the chain guide 8 is moved in parallel to the axis of multistage sprocket assembly S and is simultaneously moved radially thereof in the plane perpendicular to the axis of the same.

In addition, in FIGS. 2 and 3, reference numeral 86 designates a pulley plate caulked to the movable member 7, and reference numerals 14 and 15 designate cups disposed at both axial sides of guide pulley 81 and fixed to the movable member 7 and pulley plate 83 respectively. Reference numeral 87 designates a pulley shaft for supporting the tension pulley 82 to the pulley plate 83, and reference numeral 16 designates a washer.

Referring again to FIG. 1, in the rear derailleur of the invention constructed as foregoing, the chain guide 8 is positioned corresponding to a high speed sprocket $S_1$ and the chain engages therewith, in which a speed control lever is operated to pull a control wire W and the chain guide 8 shifts toward a low speed sprocket $S_2$ to thereby switch the chain thereto.

In a case where the speed control lever is operated insufficiently and the chain guide 8 is short of its movement to a desired sprocket, the chain guide 8 stops at the position where it does not yet reach the center line relative to the width of the desired sprocket and then the chain is intended to be switched thereto, at which time the chain skews between the guide pulley 81 and the desired sprocket. In this case, the tension of the moving chain shifts the guide pulley 81 toward the sprocket in engagement with the chain in a range of gap K with respect to the pulley plate 83. Hence, a degree of the skew of the chain between the sprocket engaging therewith and the guide pulley 81 is reduced, thereby eliminating noises generated by contact of the skew portion $C_1$ of the chain with the teeth X at the exit portion for the chain at the guide pulley 81 and teeth Y at the entrance portion for the same at the sprocket.

Incidentally, noises generated when the chain is switched from the low speed sprocket to the high speed one can similarly be eliminated.

Figure 4:
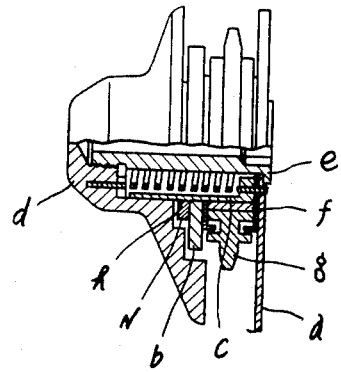
FIG. 4 is an illustration exemplary of the principal portion of a conventional rear derailleur.

In the rear derailleur of the invention, the bearing cylinder 13 is supported through the spring holder 11 onto the outer periphery of one axial end of pivot shaft 9 which is supported to the pulley plate 83. Guide pulley 81 is supported onto the outer periphery of bearing cylinder 13, and the tension spring 12 is fitted onto the pivot shaft 9 and is retained at the first end 12a into the bore 71 at the movable member 7 and at the second end 12b into the bore 84 at the pulley plate 83. Fixing shaft 10 is inserted into the pivot shaft 9 and screws at the utmost end with a threaded bore 72 provided at the movable member 7. The fixing shaft 10 is tightened to deflect the tension spring 12 axially and the axial resilient force thereof acts on the bearing cylinder 13 through the spring holder 11. As a result, bearing cylinder 13 is held to the pulley plate 83 and pulley plate 83 is mounted swingably to the movable member 7, thus supporting the chain guide 8 to the movable member 7. Such construction utilizes the spring force of tension spring 12 to hold the bearing cylinder 13 to the pulley plate 83, so that the bearing cylinder 13 is reliably held. Moreover, the bearing cylinder holding construction is very simple and inexpensive to produce as a whole in comparison with the conventional example as shown in FIG. 4.

Alternatively, the pulley plates 83 and 86 may be connected through a pulley shaft and made swingable with respect to the movable member 7, or only one pulley plate 83 or 86 may be provided. Also alternatively one pulley plate 83 or 86 may be integral with the movable member 7.

While a preferred embodiment of the invention has been described using specific terms, such description is for illustrative purpose only, and it is to be understood that changes and variations may be made without departing from the spirit or scope of the invention which is defined by the following claims.

What is claimed is:

1. A rear derailleur for a bicycle, comprising a fixing member; a movable member movable with respect to said fixing member; a chain guide having a guide pulley, a tension pulley and at least one pulley plate, said chain guide being supported swingably with respect to said movable member; a tension spring interposed between said movable member and said chain guide; said chain guide including support means for supporting said guide pulley such that said guide pulley is rotatable and axially movable in a predetermined range with respect to said pulley plate, said support means positioning said guide pulley such that in at least one operative position a gap is located between said guide pulley and said pulley plate for allowing said guide pulley to move axially with respect to said pulley plate.

2. A rear derailleur for a bicycle according to claim 1, further comprising a pivot shaft for supporting said chain guide swingably relative to said movable member, said support means for said guide pulley being coaxial with said pivot shaft.

3. A rear derailleur for a bicycle according to claim 2, wherein said support means includes a bearing cylinder having a slide surface for said guide pulley, said bearing cylinder being fixed to said pulley plate, said support means further comprising restriction means for restricting a range of axial movement of said guide pulley relative to said pulley plate.

4. A rear derailleur for a bicycle according to claim 3, wherein said tension spring comprises a coiled spring having a pair of retaining ends, said coiled spring being supported such that it surrounds said pivot shaft, said coiled spring being retained at one retaining end to said movable member and at another retaining end to said pulley plate, said pivot shaft having a spring holder for said coiled spring, said spring holder having an engaging means for engaging said bearing cylinder so that a spring force of said coiled spring biases said spring holder to press said bearing cylinder against said pulley plate.

5. A rear derailleur for a bicycle according to claim 4, wherein said engaging means comprises a projection extending radially outwardly from said spring holder for engaging an end face of said bearing cylinder, said projection projecting radially outwardly beyond an outer periphery of said bearing cylinder to operate as said restriction means for restricting said axial moving range of said guide pulley.

* * * * *